US012778028B2

(12) United States Patent
Cooley

(10) Patent No.: US 12,778,028 B2
(45) Date of Patent: Nov. 3, 2026

(54) DENSITY SPLITTING KNIFE SYSTEM

(71) Applicant: CNH Industrial America LLC, New Holland, PA (US)

(72) Inventor: Devin Cooley, New Holland, PA (US)

(73) Assignee: CNH Industrial America LLC, New Holland, PA (US)

( * ) Notice: Subject to any disclaimer, the term of this patent is extended or adjusted under 35 U.S.C. 154(b) by 216 days.

(21) Appl. No.: 18/889,463

(22) Filed: Sep. 19, 2024

(65) Prior Publication Data

US 2025/0098593 A1 Mar. 27, 2025

Related U.S. Application Data

(60) Provisional application No. 63/540,706, filed on Sep. 27, 2023.

(51) Int. Cl.
*A01F 29/00* (2006.01)
*A01F 15/04* (2006.01)

(52) U.S. Cl.
CPC .............. *A01F 29/00* (2013.01); *A01F 15/04* (2013.01)

(58) Field of Classification Search
CPC ...... A01F 29/00; A01F 15/042; A01F 15/044; A01F 15/0825; A01F 15/005
See application file for complete search history.

(56) References Cited

U.S. PATENT DOCUMENTS

| | | | | |
|---|---|---|---|---|
| 3,099,203 | A | 7/1963 | Klemm et al. | |
| 3,752,066 | A * | 8/1973 | Charles | B30B 9/3092 100/269.18 |
| 4,518,124 | A * | 5/1985 | Klinner | A01F 29/04 241/101.76 |
| 8,113,110 | B2 | 2/2012 | Kraus | |
| 9,961,836 | B2 * | 5/2018 | Demon | A01F 15/046 |
| 10,869,428 | B2 | 12/2020 | Grady | |
| 11,576,307 | B2 | 2/2023 | Olander et al. | |
| 2004/0250895 | A1 * | 12/2004 | Marx | B27L 7/06 144/193.1 |
| 2010/0224085 | A1 | 9/2010 | Hoover et al. | |
| 2019/0246566 | A1 * | 8/2019 | Roth | A01F 15/0825 |
| 2020/0000041 | A1 * | 1/2020 | Grady | A01F 15/04 |
| 2021/0169011 | A1 | 6/2021 | Grady | |
| 2022/0248608 | A1 | 8/2022 | Grady | |

* cited by examiner

*Primary Examiner* — Cathleen R Hutchins
(74) *Attorney, Agent, or Firm* — Buchanan Ingersoll & Rooney PC

(57) ABSTRACT

An agricultural baler includes a bale chamber having a discharge outlet and a bale density splitting system. The bale density splitting system includes a splitting mechanism arranged downstream of the discharge outlet, two pivoting doors arranged downstream of the splitting mechanism, and a wedge. The splitting mechanism splits a bale discharged from the bale chamber in half and outputs two smaller bales. The wedge moves the two pivoting doors away from each other to increase the density of the two smaller bales.

16 Claims, 5 Drawing Sheets

DENSITY SPLITTING KNIFE SYSTEM

CROSS REFERENCE TO RELATED APPLICATIONS

This application claims priority to U.S. Provisional Patent Application Ser. No. 63/540,706 filed Sep. 27, 2023, the contents of such application being incorporated by reference herein in its entirety.

FIELD OF THE INVENTION

The present invention relates to agricultural balers of the type commonly referred to as square balers that produce bales having a rectangular cross section, and, more particularly, to bale-splitting and bale-density control systems used with square agricultural balers.

BACKGROUND OF THE INVENTION

As is described in U.S. Patent App. Pub. No. 2010/0224085, which is incorporated by reference herein in its entirety, agricultural harvesting machines, such as balers, for example, are used to consolidate and package crop material so as to facilitate the storage and handling of the crop material for later use. In the case of hay, a mower-conditioner cuts and conditions the crop material for windrow drying in the sun. In the case of straw, an agricultural combine discharges non-grain crop material from the rear of the combine defining the straw (such as wheat or oat straw, for example) which is to be picked up by the baler. The cut crop material is typically raked and dried, and a baler, such as a square baler or a round baler, for example, straddles the windrows and travels along the windrows to pick up the crop material and form it into square or round bales. More specifically, a pickup unit at the front of the baler gathers the cut and windrowed crop material from the ground and then conveys the cut crop material into a bale-forming chamber within the baler where the crop material is compacted, typically by means of a reciprocating plunger. The bale-forming chamber usually includes a device for tying bales and a discharge outlet, for example connected to a discharge chute for gently lowering bales onto the field. During normal baling operation, tied bales are ejected from the baler through action of the plunger.

Square agricultural balers are sometimes preferred because the square-shaped bales facilitate stacking, delivery, and use. During baling, however, a small square baler has a relatively small capacity because a small square baler typically only produces one small bale at a time. Farmers may either need to have multiple small square balers operating at the same time in order to package crop material from the field efficiently or make large square bales and convert them later into bundles of small square bales. These methods may be perceived as inefficient and expensive.

Further, for the economical use of trucks for transporting the bales, bales of a high density are required. The thickness and density of each bale is directly influenced by the resistance applied to the bale being formed in the chamber behind the plunger. Resistance applied to the bale in the chamber is commonly controlled by variations in the size of the cross section of the chamber through which the crop material is being urged by the plunger by adjusting the position of one or more of the chamber side walls to vary the orifice through which the crop material is extruded. To this end, moveable tension rails, which define a portion of one or more of the walls of the chamber, are used to change the dimensions, i.e., the height and/or the width, of the chamber into which the crop material is being urged.

Typically only the position of a pair of opposing bale chamber walls is varied in order to alter the bale chamber cross-sectional area. A linkage interconnects the walls so that a single actuator can control movement of the bale chamber walls. Balers having provisions for moving all four bale chamber walls generally incorporate a more complex linkage that enables a single actuator to reposition all four walls simultaneously or are otherwise configured to coordinate simultaneous movement of all four bale chamber walls. When large square bales are converted into two smaller square bales arranged side by side in the bale chamber, it may not be possible to apply even side pressure to each bale without a density system between the two bales.

In practice, there is an inverse relationship between the quantity of bale material to be compressed on each compression stroke of the plunger and the maximum level of compression of the bale material and the density of the bale. If a large quantity of material is fed into the bale chamber, this will result in a large slice thickness and a low level of compression, and therefore a low density. On the other hand, if a small quantity of bale material is fed into the bale chamber on each stroke, this will result in a small wad thickness and a high maximum level of compression, and therefore a high density. As the throughput of the baling machine (that is, e.g., the rate in kg/hour at which material is compressed) depends on the amount of bale material compressed per stroke of the plunger, there is also an inverse relationship between the throughput of the baler and the density of the bale. The operator therefore has to choose either a high throughput and a low density, or a low throughput and a high density. With a conventional baler, a higher density may only be achieved at high throughput by strengthening the gearbox or adding an additional drive means for driving the compressed bale material towards the outlet end of the channel during successive compression cycles of the plunger, which can add to the cost of the baler.

Described herein is an agricultural baler that can produce small square bales at a fast rate and without the added expense of multiple balers, and that can increase the density of the bale by applying uniform pressure to the side planes of the bale, without excessive load on the plunger driving mechanism.

SUMMARY OF THE INVENTION

Described herein is a bale density splitting system for agricultural balers. The bale density splitting system receives a large square bale or a partially tied large square bale from the bale-forming chamber, splits the large bale into two small square bales in the bale-forming chamber, and controls the density of the two small bales as the two small bales travel downstream of the bale-forming chamber.

According to one aspect, an agricultural baler includes a bale chamber having a discharge outlet and a bale density splitting system. The bale density splitting system includes a splitting mechanism arranged downstream of the discharge outlet, two pivoting doors arranged downstream of the splitting mechanism, and a wedge. The splitting mechanism splits a bale or partially formed bale, discharged from the bale chamber in half and outputs two smaller bales. The wedge moves the two pivoting doors away from each other to increase the density of the two smaller bales.

BRIEF DESCRIPTION OF THE DRAWINGS

The drawing figures depict one or more implementations, by way of example only, not by way of limitations. In the figures, like reference numerals refer to the same or similar elements.

DETAILED DESCRIPTION OF THE INVENTION

The terms "forward," "rearward," "upward," "downward," "left," and "right," or "top" or "bottom," when used in connection with the agricultural baler described herein and/or components thereof are usually determined with reference to the direction of forward operative travel of the towing vehicle and the height of the baler, but they should not be construed as limiting. The terms "longitudinal" and "transverse" are determined with reference to the fore-and-aft direction of the towing vehicle and the width of the baler, and are equally not to be construed as limiting.

Figure 1:
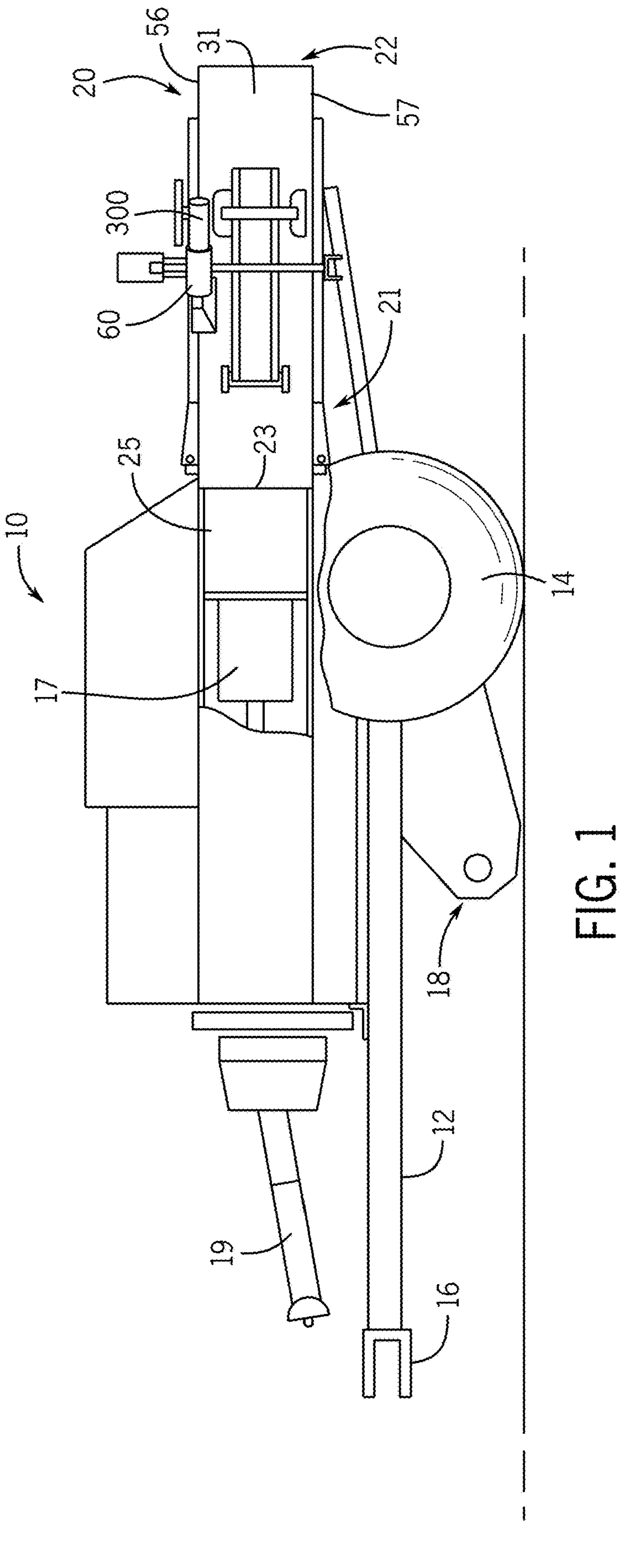
FIG. 1 is a side view of a square agricultural baler to which a bale density splitting system according to embodiments described herein may be applied.

Referring now to the drawings, and more particularly to FIG. 1, illustrated is an agricultural baler 10 for producing oblong bales (shown as 90 in FIG. 3) having generally rectangular cross-sections, generally referred to as square bales. The baler 10 includes a frame 12 that is ground-supported by wheels 14 (only one shown). A tongue 16 projects forwardly from the frame 12 and is configured for connection to a towing vehicle, such as an agricultural tractor (not shown), which is equipped with a power take-off shaft 19 for delivering motive power to the various driven components in the baler 10.

As shown in FIG. 1, a pick-up assembly 18 is provided in order to take up a swath or windrow of harvested crop from the ground and to deliver it toward a bale chamber 20. The bale chamber 20 includes a forward portion 21 and a rearward portion 22. A plunger 17 is reciprocally disposed adjacent to the forward portion 21 of bale chamber 20 to form crop material into square bales in a conventional manner. When baling a crop material (such as hay) in a square bale, the baler 10 may be outfitted with a pre-compression chamber that forms a slice of bale material. The pre-formed slice may be injected into the main bale chamber 20 where a bale is formed. Once a slice of crop material is formed and ejected from the pre-compression chamber, the plunger 17, which may be continually driving mechanically or hydraulically like a piston in an engine, for example, moves from the forward portion 21 to the rearward portion 22 of the bale chamber 20, forcing a slice of crop material to compress. In this manner, slices of crop material are pushed toward the rearward portion 22 of the bale chamber 20, and are compressed while forming the bale. The formed square bales are urged sequentially through the bale chamber 20 to a tying assembly 25 that wraps and ties around the bale a suitable material, such as twine, for example (shown as 92 in FIG. 3), and then discharged from the baler 10 onto the ground surface of the field.

Figure 3:
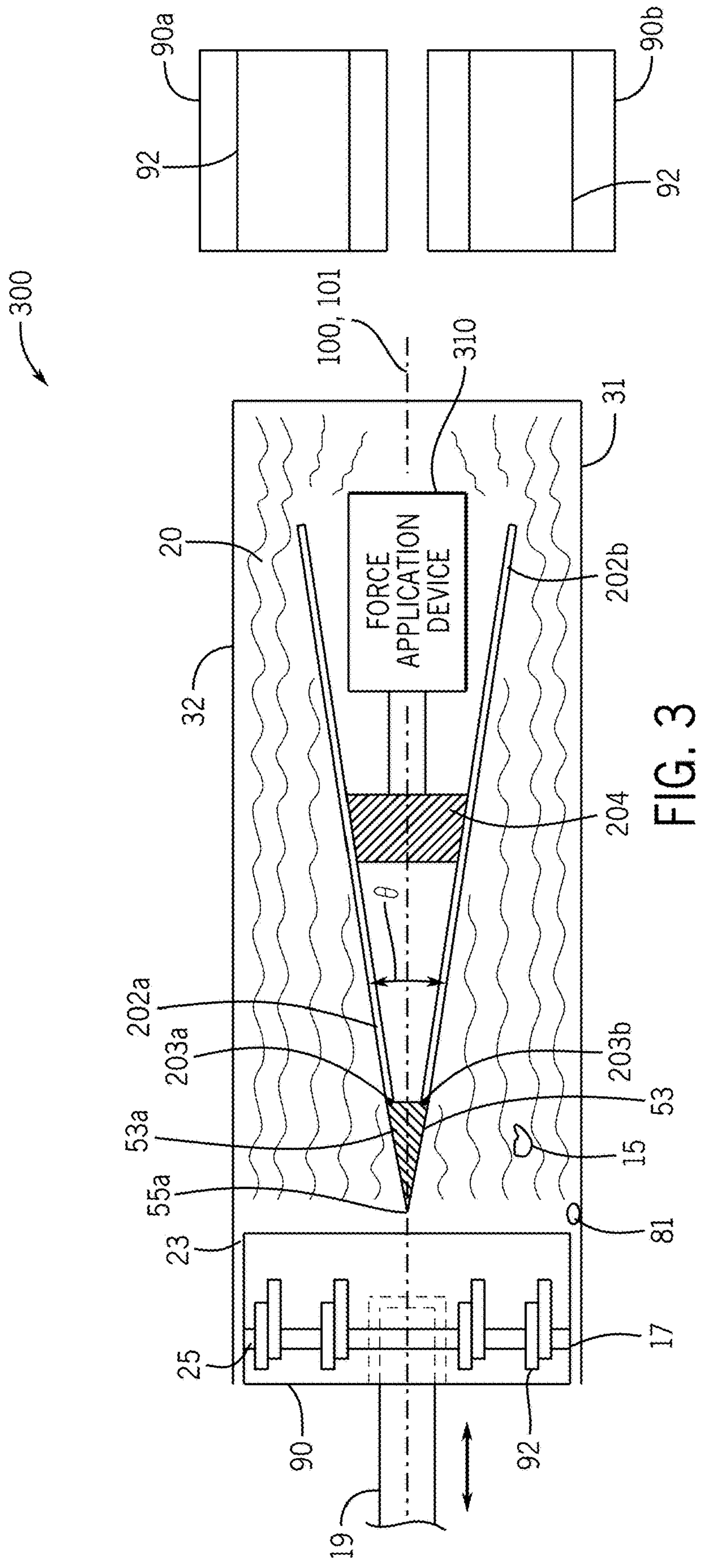
FIG. 3 is a top plan view of a bale density splitting system of the baler of FIG. 1, which is shown schematically, according to an embodiment.

Referring back to FIG. 1, the bale chamber 20 is defined by an upper side (e.g., roof) 56, a lower side (e.g., floor) 57, and a pair of generally opposing and parallel side walls 31, 32 (only side wall 31 is shown in FIG. 1), forming a generally rectangular opening through which bales pass forwardly to rearwardly along a bale travel axis (shown as axis 100 in FIG. 3). The upper side 56 may be open. The rectangular shape of bale chamber 20 generally establishes the cross-sectional rectangular size of the bale. A bar 60 or other mounting surface (generically referred to as a 'mount') may be arranged on the upper side (e.g., roof) 56 of the baler 10. A similar bar or other mounting surface may be arranged on the lower side (e.g., floor) 57 or the side walls 31, 32 of the baler 10. The bar 60 may be used for mounting the bale density splitting system described hereinafter.

Figure 2:
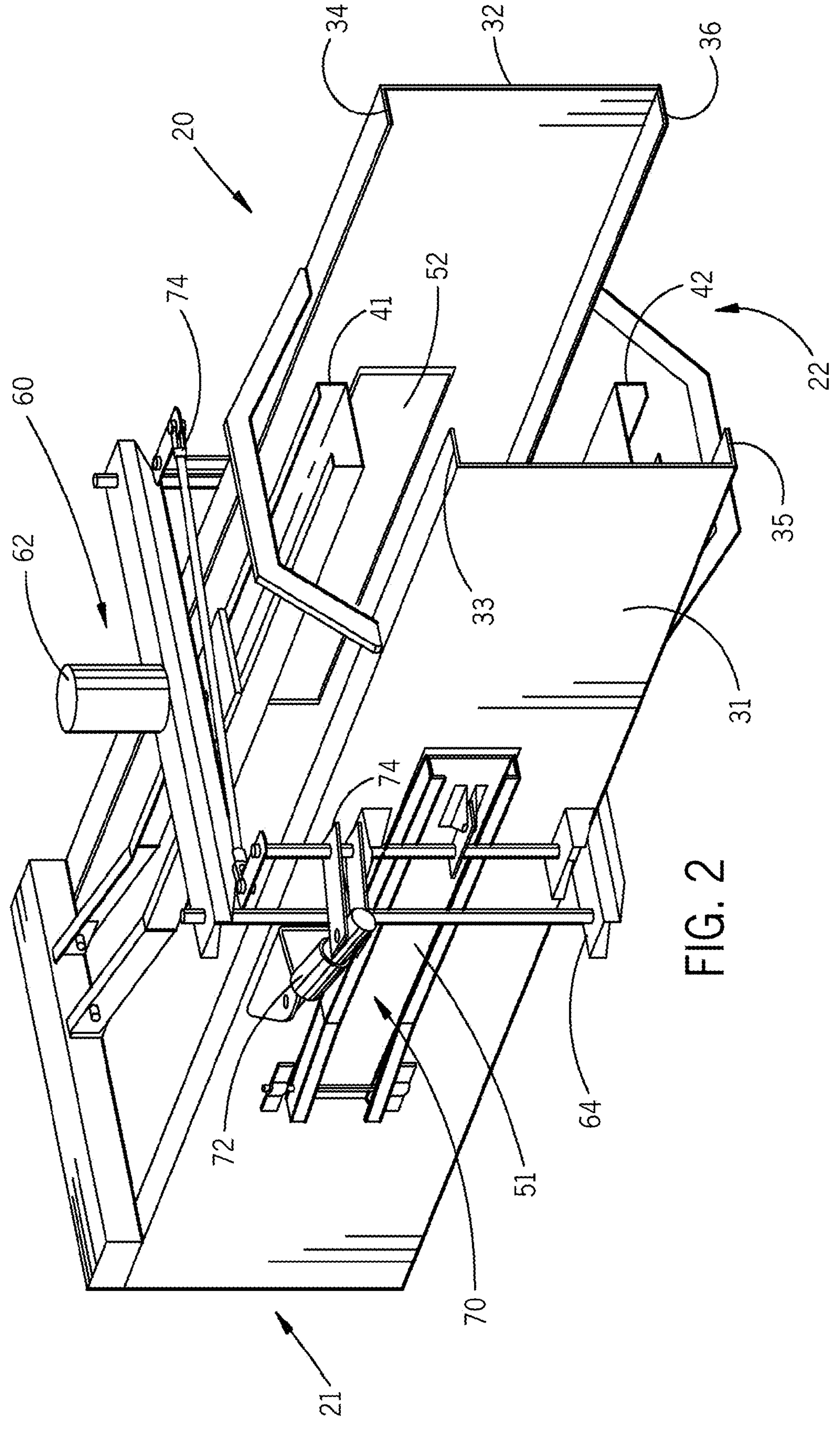
FIG. 2 is an enlarged rear perspective view of the baler of FIG. 1 detailing an adjustable bale chamber to which a bale density splitting system according to embodiments described herein may be applied.

Referring now to FIG. 2, the side walls 31, 32 are each bounded by angle-shaped upper corner rails 33, 34 and lower corner rails 35, 36 to form a generally rectangular opening through which bales pass forwardly to rearwardly along a bale travel axis (shown as axis 100 in FIG. 3). The side walls 31, 32 and the upper and lower corner rails 33, 34, 35, 36 are typically fixed with respect to the frame 12, but may include provisions for adjusting the size of the bale chamber 20. The bale chamber 20 is further defined by an opposing elongate upper tension rail 41 and lower tension rail 42. The elongate upper and lower tension rails 41, 42 are oriented along the upper and lower side walls of the bale chamber 20, generally parallel to the forward-rearward bale travel axis 100 of the bale chamber 20, and pivotally connected adjacent to their forward-most ends to the baler frame 12. The upper and lower tension rails 41, 42 are connected to a vertical positioner mechanism 60 that interconnects the baler frame 12 and the upper and lower tension rails 41, 42 in a manner that pivots the tension rails 41, 42 in a coordinated and simultaneous manner to move the rearward ends of the tension rails 41, 42 inwardly into the bale chamber 20 or outwardly from the bale chamber 20 as a means of adjusting the effective height of the bale chamber 20 and hence the resistance to movement applied to the top and bottom surfaces of a bale moving through the bale chamber 20. The upper and lower tension rails 41, 42 may substantially form the upper and lower surfaces of the bale chamber 20, or may protrude into the bale chamber 20 through openings provided in the upper and lower surface of the bale chamber in designs featuring four planar walls to define the bale chamber. The vertical positioner mechanism 60 includes a vertical actuator 62, typically a hydraulic cylinder, and a linkage 64 interconnecting the upper and lower tension rails 41, 42 so that movement of the hydraulic cylinder is translated into coordinated movement of the upper and lower guide rails 41, 42. A manually operated mechanical actuator 62, such as a screw and spring adjuster mechanism or the like, may also be provided in lieu of a hydraulic cylinder.

The bale chamber 20 can be further defined by a pair of generally opposing elongate side tension rails 51, 52 (only rail 51 is shown in FIG. 2), one disposed on each vertical side 31, 32 of the bale case. Similar to the upper and lower tension rails 41, 42, the side tension rails 51, 52 are oriented along the sides of the bale chamber 20, generally parallel to the forward-rearward bale travel axis 100 of the bale chamber 20 and pivotally connected to a side positioner mechanism 70 that interconnects the baler frame and the side tension rails 51, 52 in a manner that pivots the tension rails 51, 52 in a coordinated and simultaneous manner inwardly into the bale chamber 20 or outwardly from the bale chamber 20 as a means of adjusting the effective width of the bale chamber 20 and hence the resistance to movement applied on the sides of a bale moving through the bale chamber 20.

Further details of baler 10 may be described in U.S. Patent App. Pub. No. 2010/0224085, which is incorporated by reference herein in its entirety and for all purposes.

In a first aspect, a bale density splitting system 300 (FIG. 3) is provided for an agricultural baler 10, more particularly a large square baler or a rectangular baler, i.e., a machine for forming square or rectangular bales from agricultural crop material. In a large square baler, for example, large bales are discharged in a longitudinal discharge direction from a discharge outlet 23 (FIG. 1) arranged at the forward portion 21 of the bale-forming chamber 20, usually with the larger side of the bale positioned perpendicular relative to the side walls 31, 32 of the baler 10, as illustrated in FIG. 3, for example. The bale density splitting system 300 includes a splitting device or a cutting mechanism, such as a knife, for example, attached to the back of the baler 10. The bale density splitting system 300 can receive bound with twine 92 large bales 90 that are fully bound with twine 92 (FIG. 3) and split them into two small square bales before discharging bales on the surface of the ground. Alternatively, the bale density splitting system 300 can split the large bales 90 into two small square bales at the same time as the large bales 90 are bound with twine 92. In other words, the bale density splitting system 300 cuts or splits the large bale 90 in two smaller bales after the large bale 90 is tied or bound with twine 92 or while the large bale 90 is being tied or bound with twine 92. Alternatively, twine 92 may be applied after the two smaller bales are formed. The bale density splitting system 300 cuts the large bale 90 along a line that runs parallel to the longitudinal discharge direction (i.e., the fore-aft direction) or parallel to the bale travel axis 100.

The bale density splitting system 300 according to embodiments of the present invention may be a separate structure for being added or retro-fitted into an existing agricultural baler. Alternatively, the bale density splitting system 300 may be built into agricultural baler 10.

Referring now specifically to FIG. 3, bale density splitting system 300 includes a cutting or splitting device, such as a knife 53, for example. The knife 53 includes a vertically extending blade **53*a*, for example (shown in FIG. 4). The knife 53 can be mounted to the back of the baler 10, between the forward portion 21 and the rearward portion 22 of the bale chamber 20, and downstream of the plunger 17 and in parallel to the tying assembly 25 that wraps and ties twine 92 around the bale 90. For example, the knife 53 can be mounted to an upper bar (similar to the bar 60 in FIG. 1) arranged at the upper side (e.g., roof) 56 of the baler 10. Knife 53 may be either stationary or movable. Alternatively, the knife 53 can be mounted to a similar bar arranged at the lower side (e.g., floor) 57 of the baler 10 for example. The knife blade 53*a* extends vertically between the upper side (e.g., roof) 56 and the lower side (e.g., floor) 57 of the baler 10. The knife blade 53*a* extends in parallel to the side walls 31, 32 of the baler 10**.

Figure 4:
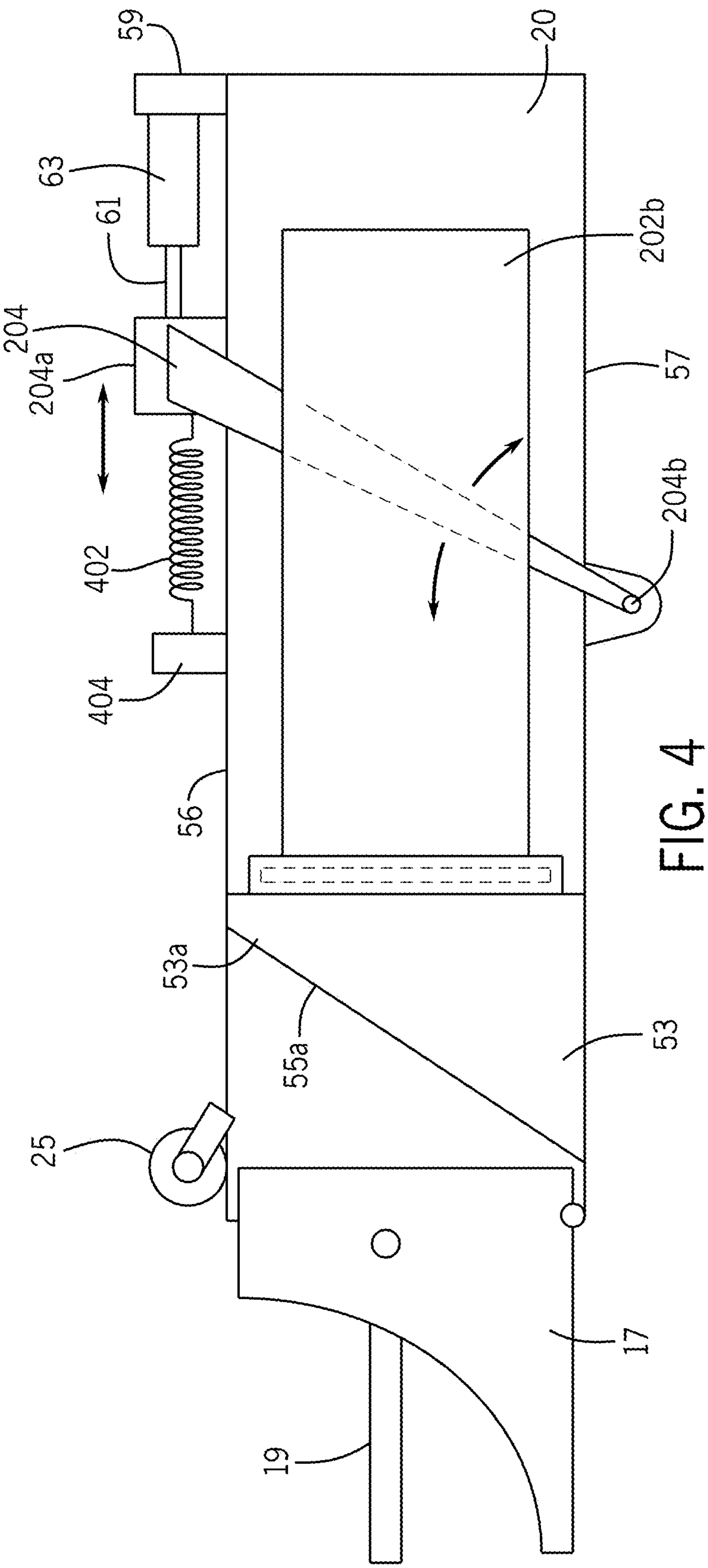
FIG. 4 is a side view of the bale density splitting system of FIG. 3, which is shown schematically, according to an embodiment.

As shown in FIGS. 3 and 4, the knife blade **53*a* has a sharpened angled or serrated edge 55*a*, for example. The knife blade 53*a* can split the bale 90 in the middle, forming two smaller square bales 90*a* and 90*b*. The two smaller square bales 90*a* and 90*b* are illustrated schematically in FIG. 3**.

Turning back to FIG. 3, the sharp edge **55*a* of the knife blade 53*a* is arranged to face the discharge outlet 23 of the bale-forming chamber 20 proximal to the tying assembly 25, and the large bales 90 advancing from the discharge outlet 23 of the bale-forming chamber 20 through the baler 10. The sharp edge 55*a* is configured to pass through the bale 90, along the width-wise centerline 101 of the bale 90, thereby slicing the bale 90 in the middle, forming two smaller square bales 90*a* and 90*b* (FIG. 3**).

In operation, the formed large square bales 90 advance sequentially through the bale chamber 20, where they may be bound with a suitable material, such as twine 92, for example (shown in FIG. 3). As illustrated in FIG. 3, the length dimension of the bales 90 extends transversely between the side walls 31, 32 of the baler 10, and the height dimension of the bales 90 extends between the upper side (e.g., roof) 56 and the lower side (e.g., floor) 57 of the baler 10. Before the bound with twine 92 bale 90 is discharged from the discharge chute of the baler 10 to the ground surface of the field, the bound or partially bound bale 90 is pushed against and past the knife blade **53*a*. The knife blade 53*a* splits each bale 90 along the centerline 101 while the bale 90 is still in the bale chamber 20, forming two small bales 90*a* and 90*b***.

The knife blade **53*a* is arranged in a central position substantially corresponding to the forward-rearward bale travel axis 100 of the bale chamber 20 (FIGS. 3 and 5) such that the knife blade 53*a* splits each bale 90 along the centerline 100 of the bale 90 and between the twine 92, without cutting the twine 92**.

Turning back to FIG. 3, two pivoting doors **202*a* and 202*b* are arranged in the bale chamber 20 at a location that is directly behind (i.e., downstream of) the knife blade 53*a*. Each of the two pivoting doors 202*a* and 202*b* is configured to pivot around a pivot point 203*a* and 203*b*, respectively, such that, when pivoting, the two pivoting doors 202*a* and 202*b* move away from each other, in the transverse direction of the baler 10, towards the side walls 31 and 32. The spread of the wedge 204 or the angle θ between the two pivoting doors 202*a* and 202*b* is illustrated exaggerated in FIG. 3 to promote understanding. In practice, the spread of the wedge 204 or the angle θ between the two pivoting doors 202*a* and 202*b* would be very small (e.g., a few degrees) at the back of the two pivoting doors 202*a* and 202*b*. The pivot points 203*a* and 203*b* may be disposed at the trailing edges of knife 53. The two pivoting doors 202*a* and 202*b* can be connected to the knife 53. Alternatively, the two pivoting doors 202*a* and 202*b* can be disposed slightly away from the knife 53, without direct connection between the two pivoting doors 202*a* and 202*b* and the knife 53. Due to this pivoting movement, each of the two pivoting doors 202*a* and 202*b* can compress one of the two smaller bales 90*a* and 90*b* advancing through the bale-forming chamber 20 between the side walls 31 and 32 of the bale chamber 20 and the respective pivoting door of the two pivoting doors 202*a* and 202*b*. The movement and the positions of the two pivoting doors 202*a* and 202*b* can be adjusted to control the density of the two smaller bales 90*a* and 90*b*. For example, the density of the two smaller bales 90*a* and 90*b* can be controlled or adjusted by varying the angle θ between the two pivoting doors 202*a* and 202*b***, for example.

The two pivoting doors **202*a* and 202*b* can be configured to pivot around the pivot points 203*a* and 203*b*, respectively, by way of a force application mechanism 310, for example. Force application mechanism 310 includes a wedge 204 (FIG. 4) that is moveably positioned between the two pivoting doors 202*a* and 202*b***. Force application mechanism

310 may further comprise a passive device, such as a spring 402 that biases wedge 204 to move the doors 202*a* and 202*b* outwardly. Alternatively, force application mechanism 310 may further comprise an active device, such as an actuator 59 that moves wedge 204 to move the doors 202*a* and 202*b* either toward or away from each other. As shown in FIG. 4, one end 204*a* of the wedge 204 is connected to the spring 402 or the actuator 59. The other end 204*b* of the wedge 204 can be pivotably coupled at the bottom (e.g., the floor 57) of the bale chamber 20 or to the frame 12 of the baler 10 below the floor 57. The central portion of the wedge 204 is positioned between the doors 202*a* and 202*b*, as best shown in FIG. 4. As shown in FIG. 3, the central portion of the wedge 204 has a parallelogram wedge shape as viewed from above. The slanted sides (i.e., slanted relative to center-line 101) of the wedge 204 are respectively positioned against the doors 202*a* and 202*b*.

The force application mechanism 310 can be an adjustable tension mechanism that can include the wedge 204 connected to a spring 402 (FIG. 4) or multiple springs attached to one of the walls of the bale chamber 20 or to the frame of the baler 10 by way of a spring bar or rod 404, for example. Movement of the two pivoting doors 202*a* and 202*b* can be accomplished by the spring 402 that can provide tension between the spring bar or rod 404 and the wedge 204. The spring 402 may be arranged on the upper side (e.g., roof) 56 of the baler 10 or above the bar 60 (FIG. 1). The spring force of the spring 402 can be adjusted to tune the frictional force between the engagement surfaces of each of the two pivoting doors 202*a* and 202*b* by adjusting the force between the spring bar or rod 404 and each of the two pivoting doors 202*a* and 202*b*.

The spring 402 is connected to the wedge 204 to bias the wedge 204 toward the stationary knife 53, which in turn biases the two pivoting doors 202*a* and 202*b* outwardly. Spring bar or rod 404 may be either stationary or movable, as noted above.

Alternatively, the force application mechanism 310 can be an active device that can include the wedge 204 operatively connected to actuator 59, for example, such as an electric linear actuator, a pneumatic cylinder, an electronic actuator, or a hydraulic cylinder, e.g., double acting hydraulic cylinder having a moveable piston 61 and controlled by a hydraulic control circuit. However, embodiments are not limited to this configuration, and in other embodiments, the actuator may be driven by a pulley system, an electric motor, a solenoid, etc.

Turning now to FIG. 4, each of the two pivoting doors 202*a* and 202*b* is operatively connected to actuator 59. The actuator 59 is configured to move the two pivoting doors 202*a* and 202*b* either toward or away from each other. Stated differently, the actuator 59 is configured for pushing the two pivoting doors 202*a* and 202*b* towards the two smaller bales 90*a* and 90*b*, thereby compressing the two smaller bales 90*a* and 90*b* between the side walls 31 and 32 of the bale chamber 20 and the two pivoting doors 202*a* and 202*b*, to control the density of the two smaller bales 90*a* and 90*b*. The actuator 59 is operatively connected to the wedge 204 to move the wedge 204 toward the stationary knife 53, which in turn moves the two pivoting doors 202*a* and 202*b* outwardly.

The actuator 59 may be configured to be mounted to the upper bar 60 or to a similar lower bar, for example. Alternatively, the actuator 59 may be configured to be mounted to the top and bottom walls, e.g., the roof 56, the rod 404, or the floor 57 of the baler 10, for example.

The actuator 59 can include a cylinder 63 in which a piston or rod 61 reciprocates. Movement of the rod 61 within the cylinder 63 of the actuator 59 translates and/or rotates the wedge 204 about the axis at end 204*b*, which causes pivoting of the two pivoting doors 202*a* and 202*b* about their respective axes 203*a* and 203*b*. For example, when the rod 61 is retracted, the two pivoting doors 202*a* and 202*b* may be positioned close to each other, or almost touching each other, which results in little to no compression of the two smaller bales 90*a* and 90*b*. Conversely, when the rod 61 is extended (see FIG. 3), the two pivoting doors 202*a* and 202*b* may be driven in the transverse direction of the baler 10, towards the two smaller bales 90*a* and 90*b* and the side walls 31 and 32 of the baler 10, thereby compressing the two smaller bales 90*a* and 90*b* between the two pivoting doors 202*a* and 202*b* and the side walls 31 and 32 of the baler 10.

The actuator 59 can be connected to a controller, an actuation circuit, or to other systems of the baler 10 by a hydraulic hose or a conduit, and/or by way of electric wires, cables, a bundle of wires or cables, or a wiring harness that includes various stranded or solid wires that interconnect the actuator 59 with various mechanical, hydraulic, or electrical components of the baler 10, for example.

The two pivoting doors 202*a* and 202*b* can function as the primary (and only) density control mechanism for controlling or adjusting the density of the two smaller bales 90*a* and 90*b*, by applying pressure to the sides of the two smaller bales 90*a* and 90*b*, as the two smaller bales 90*a* and 90*b* are compressed between the side walls 31 and 32 of the bale chamber 20 and the two pivoting doors 202*a* and 202*b*.

Alternatively, the two pivoting doors 202*a* and 202*b* can be used as an additional (e.g., side) density control mechanism, which can be used to control or adjust the density of the two smaller bales 90*a* and 90*b* in the transverse direction (e.g., between the pivoting doors 202*a* and 202*b* and the side walls 31 and 32 of the bale chamber 20), in parallel with, or in addition to, the upper bale tension rail 41 and the lower bale tension rail 42 (FIG. 2), which can be used to control or adjust the density of the two smaller bales 90*a* and 90*b* in the vertical direction (e.g., between the floor 57 and the roof 56 of the bale chamber 20). As another alternative, the upper bale tension rail 41 and the lower bale tension rail 42 can be used in conjunction with compression rails 51 and 52 (only compression rail 51 is shown in FIG. 2).

Figure 5:
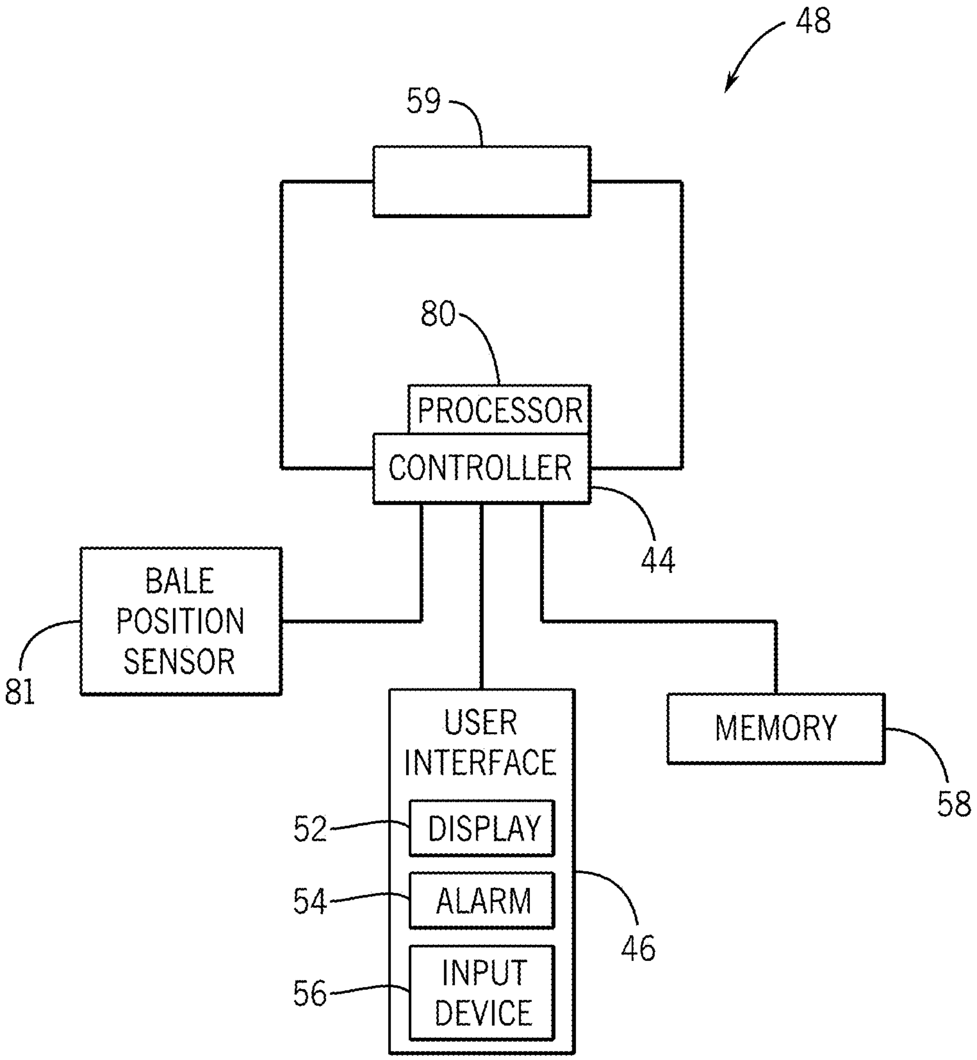
FIG. 5 is a schematic diagram of an exemplary control circuit for use with the bale density splitting system according to an embodiment.

To facilitate management of the baling process, the bale density splitting system 300 can include a control system 48, illustrated in FIG. 5, for example. In the illustrated embodiment, the control system includes a controller 44, a user interface 46, at least one bale position sensor 81, and an actuator 59. The controller 44 can be configured to receive signals from the operator through the user interface 46 and from sensors (e.g., a bale position sensor 81 discussed below) associated with the bale density splitting system 300. In addition, the controller 44 can be configured to send signals to the actuator 59.

In the embodiment illustrated in FIG. 5, the control system 48 includes a memory 58 and a processor 80. The memory 58 may be any type of non-transitory machine readable medium for storing data and executable instructions, such as random-access memory, read-only memory, rewritable flash memory, hard drives, optical discs, and the like. The processor 80 may execute instructions stored on the memory 58. For example, the memory 58 may contain machine readable code, such as instructions, that may be executed by the processor 80. In some embodiments, the memory 58 and processor 80 may enable automatic (e.g., processor/memory controlled) splitting and compression of the bale 90.

Turning back to FIGS. 3 and 4, the actuator 59 can be triggered in multiple ways. For example, a sensor 81 (or multiple sensors) can be arranged in an area (e.g., side walls 31 and/or 32) between the discharge outlet 23 (FIG. 1) of the bale chamber 20 and the knife blade 53*a*. The sensor 81 can be configured to sense when a bale 90 is advancing from the discharge outlet 23 of the bale chamber 20 and approaching the knife blade 53*a*. Alternatively, or additionally, a sensor that detects the position of the plunger 17 could be used to trigger/drive the pivoting movement of the two pivoting doors 202*a* and 202*b*. For example, a signal from the sensor 81 to the controller 44 will result in extension of the actuator 59 based on the position of the plunger 17, pushing the two pivoting doors 202*a* and 202*b* in the transverse direction of the baler 10, towards the side walls 31 and 32, and towards the two smaller bales 90*a* and 90*b*. The control system 48 can drive the wedge 204 constantly at a predetermined displacement value with respect to the knife 53. The control system 48 can also automatically set a specific pressure on the actuation cylinder 59 that drives the wedge 204. In operation, the wedge 204 can be set to a specific constant position or hydraulic cylinder pressure, to maintain a constant density of the bales as they stack up in the bale chamber 20.

Another way of triggering the actuator 59 can be by monitoring a dwell time, without using the sensor 81. Further details regarding the triggering of the actuator 59 may be described in U.S. patent application Ser. No. 18/211,413, which is incorporated by reference herein in its entirety and for all purposes.

In other embodiments, the bale density splitting system 300 can use a mechanical, e.g., lever system, to push or move the two pivoting doors 202*a* and 202*b* away from each other, towards the two smaller bales 90*a* and 90*b*.

The bale density splitting system 300 illustrated in the figures and described above increases the throughput of the baler and produces multiple small square bales simultaneously, unlike a conventional small baler that only produces one bale at a time, by splitting a large square bale that enters the bale-forming chamber into two small square bales. The bale density splitting system 300 illustrated in the figures and described above also increases the density of the produced smaller bales, without significantly affecting the throughput of the baler and without excessive load on the plunger driving mechanism, by applying uniform pressure to side planes of the bales, without a complex linkage of the bale chamber walls, but instead by using two pivoting doors arranged directly behind the splitting mechanism which move away from each other to increase the density of the two smaller bales.

The bale density splitting system 300 illustrated in the figures and described above can be implemented in any hay and forage agricultural vehicle that harvests a grass type crop, including but not limited to small square baler pickups or large square baler pickups, for example.

While this invention has been described with respect to at least one embodiment, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. An agricultural baler, comprising:

a bale chamber having a discharge outlet; and a bale density splitting system including:

a splitting mechanism arranged downstream of the discharge outlet, the splitting mechanism being configured to split a bale discharged from the discharge outlet into two smaller bales;

two pivoting doors arranged downstream of the splitting mechanism; and a wedge configured to move the two pivoting doors away from each other to increase a density of the two smaller bales.

2. The agricultural baler of claim 1, wherein the splitting mechanism comprises a knife having a knife blade with a sharpened angled edge.

3. The agricultural baler of claim 2, wherein the sharpened angled edge is arranged to face the discharge outlet proximal to a tying assembly.

4. The agricultural baler of claim 2, wherein the knife blade extends along a height of the bale chamber.

5. The agricultural baler of claim 1, further comprising at least one spring attached to a wall or a frame of the baler, wherein the at least one spring is connected to the wedge to bias the two pivoting doors outwardly away from each other.

6. The agricultural baler of claim 5, wherein each of the two pivoting doors is configured to pivot around a corresponding pivot point disposed at a trailing edge of the splitting mechanism or around two co-located pivot points.

7. The agricultural baler of claim 1, further comprising an actuator, wherein the actuator is operatively connected to the wedge to move the wedge, which causes the two pivoting doors to move outwardly away from each other.

8. The agricultural baler of claim 1, wherein the two pivoting doors are configured to move away from each other in a transverse direction of the agricultural baler.

9. The agricultural baler of claim 1, wherein the bale density splitting system further comprises an adjustable tension mechanism configured to move the wedge, which causes the two pivoting doors to move outwardly away from each other.

10. The agricultural baler of claim 9, wherein the adjustable tension mechanism comprises at least one spring.

11. The agricultural baler of claim 1, wherein the bale density splitting system further comprises an actuator configured to move the wedge, which causes the two pivoting doors to move outwardly away from each other.

12. The agricultural baler of claim 11, wherein the actuator comprises a hydraulic cylinder.

13. The agricultural baler of claim 1, wherein the bale chamber comprises a moveable upper bale tension rail and a moveable lower bale tension rail, wherein each tension rail is moveable to compress the bales.

14. The agricultural baler of claim 13, wherein the bale density splitting system is used as a density control mechanism for the two smaller bales in parallel with the moveable upper bale tension rail and the moveable lower bale tension rail.

15. The agricultural baler of claim 1, wherein the bale chamber comprises two moveable side tension rails, wherein each side tension rail is moveable to compress the bales, and wherein the bale density splitting system is used as a density control mechanism for the two smaller bales in parallel with the two moveable side tension rails.

16. The agricultural baler of claim 1, wherein the bale density splitting system is either a separate structure configured to be added or retro-fitted into the agricultural baler or the bale density splitting system is built into the agricultural baler.

* * * * *